UNITED STATES PATENT OFFICE.

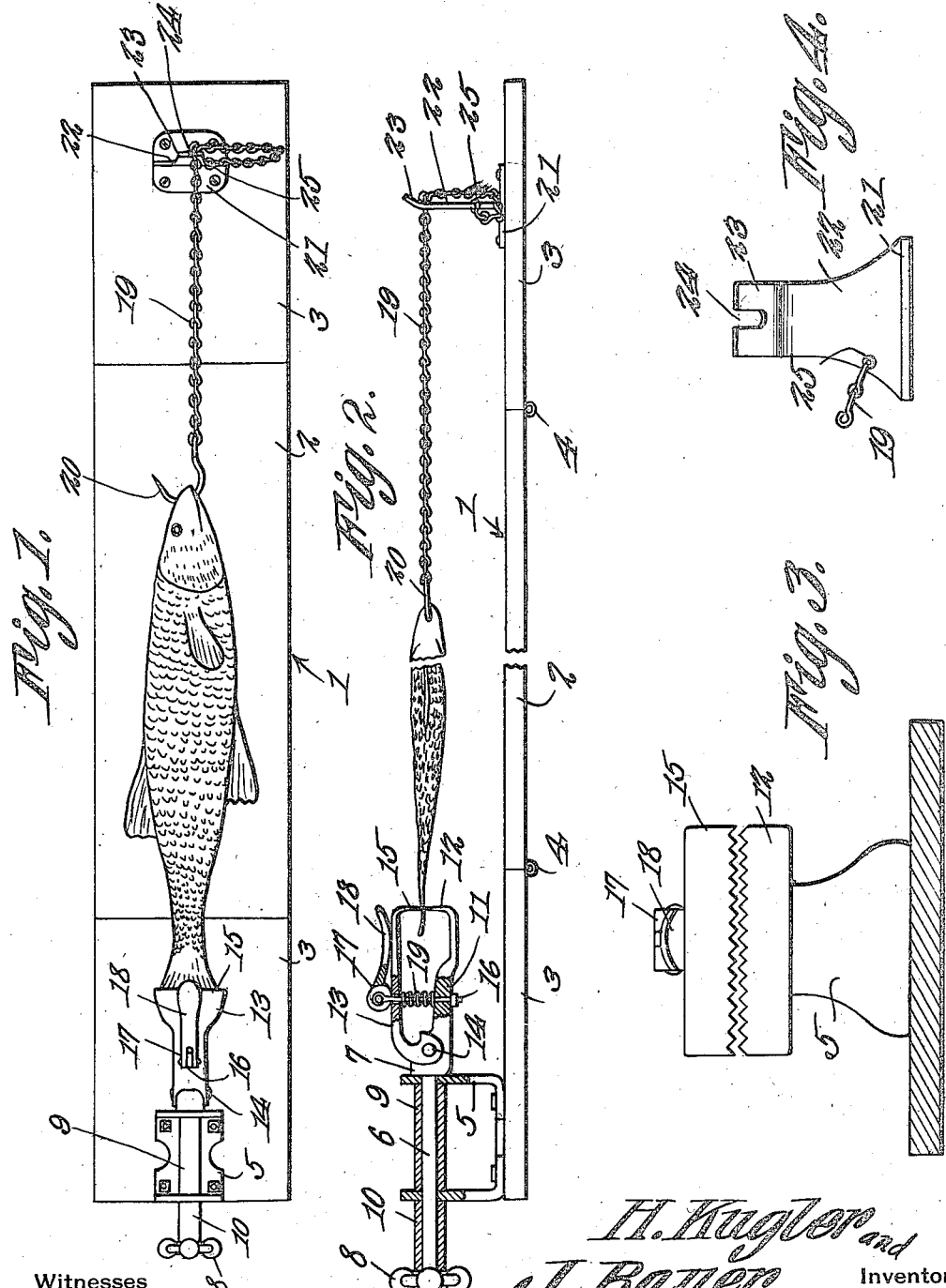

HENRY KUGLER AND JOSEPH BAUER, OF FERGUS FALLS, MINNESOTA.

FISH-DRESSING DEVICE.

1,259,109.  Specification of Letters Patent.  Patented Mar. 12, 1918.

Application filed August 23, 1917. Serial No. 187,824.

*To all whom it may concern:*

Be it known that we, HENRY KUGLER and JOSEPH BAUER, citizens of the United States, residing at Fergus Falls, in the county of Ottertail, State of Minnesota, have invented a new and useful Fish-Dressing Device, of which the following is a specification.

The invention relates to a device for dressing fish, and aims to provide a novel and improved contrivance of that character for holding the fish for conveniently scaling or cleaning it.

A further object of the invention is the provision of a fish dressing device having means for conveniently holding various sizes of fish, and enabling the fish to be turned over for scaling or cleaning both sides thereof.

It is also the object of the invention to provide a fish dressing device of the nature indicated which is simple and inexpensive in construction, and convenient and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein—

Figure 1 is a plan view of the device.

Fig. 2 is a side elevation thereof, portions being broken away and shown in section.

Fig. 3 is an enlarged elevation of the tail clamp looking at the jaws thereof.

Fig. 4 is an enlarged elevation of the takeup for the chain.

In carrying out the invention, there is provided a suitable elongated base 1, which may be of one piece or board, but which, when a foldable structure is desired, is composed of sections. As shown, the base comprises the intermediate and end sections 2 and 3, respectively, hinged together, as at 4, whereby the end sections 3 can be swung downwardly against the lower surface of the section 2, thus folding the device for compact storage or transportation.

A tail clamp is carried by one section 3 of the base, the same embodying a U-shaped bracket 5 through the arms of which a stem 6 is journaled for rotation longitudinally of the base, said stem having a head 7 bearing against one arm of the bracket 5, and the stem having a handle 8 at its other end. A spacing sleeve 9 is disposed on the stem 6 between the arms of the bracket 5, and a second spacing sleeve 10 is disposed on said stem between the handle 8 and corresponding arm of the bracket, whereby to hold the parts in place. The head 7 has a jaw 11 projecting therefrom and provided at its end with a lip 12 extending at an angle and serrated or toothed. A second jaw 13 has a bifurcated portion pivoted, as at 14, to the head 7, and the jaw 13 is provided at its free end with a lip 15 extending at an angle and serrated or toothed, in order that the tail of the fish can be held between the toothed or serrated lips of the two jaws. This provides a tail clamp for holding the tail of the fish.

The tail clamp is provided with means for closing the jaws, comprising a rod 16 extending through the jaws and having a portion seated against the jaw 11. The rod 16 is pivoted within a bifurcated cam or eccentric 17 bearing against the jaw 13, and said cam has a finger piece 18 which when swung against the forward portion of the jaw 13, will cause the cam to move said jaw toward the jaw 11 to grip the tail of the fish. A coiled wire expansion spring 19 is preferably disposed on the rod 16 between the jaws, to open them when the finger piece 18 is swung away from said jaws, thus permitting the fish to be applied to or removed from the tail clamp.

A chain 19 or other flexible element is employed for holding the fish taut above the base. The free end of the chain 19 has a hook 20 to engage the head of the fish. A takeup is employed for holding the chain 19, and embodies a base plate 21 secured on the section 3 of the base 1 and provided with a standard 22, the upper end 23 of which is bent at an angle away from the tail clamp and provided with an upwardly opening slot 24 for receiving the links of the chain. The other end of the chain is anchored, as at 25, to the standard 22. After the tail of the fish is applied to the tail clamp, the chain is pulled to stretch the fish, and the corresponding link of the chain is then moved downwardly into the slot 24, whereby the chain link in engaging behind the portion 23 of the standard, will prevent the chain from slipping back. This will hold the fish taut, in order that it can be scaled or cleaned easily. The chain 19 can, of course, be taken up for fish of any length, within the limits of the device, and by turning the stem 6 through the medium of the handle 8, the tail clamp can be rotated, thereby turning the fish. This enables the fish to be turned over for cleaning both sides thereof, without the necessity of detaching or handling the fish.

Having thus described the invention, what is claimed is:—

A fish dressing device embodying a base, a stem rotatably mounted on the base to be turned by hand, a clamp carried by said stem for holding the tail of a fish and turning same over when the stem is rotated, a flexible element having means for engaging the head of a fish, and a take-up device carried by the base for holding said flexible element with the fish taut.

In testimony that we claim the foregoing as our own, we have hereto affixed our signatures in the presence of two witnesses.

HENRY KUGLER.
JOSEPH BAUER.

Witnesses:
A. P. FRANKBERG,
P. N. HANSON.